United States Patent
Miller et al.

(10) Patent No.: US 9,196,172 B1
(45) Date of Patent: Nov. 24, 2015

(54) WEIGHT LOSS SYSTEMS AND METHODS

(75) Inventors: Steven B. Miller, St. Louis, MO (US); Robert F. Nease, St. Louis, MO (US); Katherine H. Sundararaman, St. Louis, MO (US)

(73) Assignee: EXPRESS SCRIPTS, INC., St. Louis, MO (US)

( * ) Notice: Subject to any disclaimer, the term of this patent is extended or adjusted under 35 U.S.C. 154(b) by 113 days.

(21) Appl. No.: 13/341,679

(22) Filed: Dec. 30, 2011

(51) Int. Cl.
*G09B 19/00* (2006.01)

(52) U.S. Cl.
CPC .................................. *G09B 19/00* (2013.01)

(58) Field of Classification Search
CPC .............................. G09B 19/00; G09B 23/28
USPC ................ 434/127, 238; 705/2; 341/127, 238
See application file for complete search history.

(56) References Cited

U.S. PATENT DOCUMENTS

| | | | |
|---|---|---|---|
| 2005/0080462 A1* | 4/2005 | Jenkins et al. | 607/58 |
| 2007/0168227 A1 | 7/2007 | Fleming et al. | |
| 2008/0201174 A1* | 8/2008 | Ramasubramanian et al. | 705/3 |

OTHER PUBLICATIONS

State of Michigan, Department of Labor & Economic Growth, Office of Financial and Insurance Services, Order, Nov. 26, 2007, 6 pages.
Missouri Register, Title 22—Missouri Consolidated Health Care Plan, Division 10—Health Care Plan, Chapter 3—Public Entity Membership, Feb. 1, 2011, vol. 36, No. 3, pp. 428-430.
lapbandtalk.com, Documented Proof of Failed Medical Weight Loss???, Lap Band Talk Forums, Retrieved Jul. 25, 2011 from http://www.lapbandtalk.com/topic/105742-documented-proof-of-failed-medical-weight-loss/, 7 pages.

* cited by examiner

*Primary Examiner* — Kesha Frisby
(74) *Attorney, Agent, or Firm* — Bryan Cave LLP

(57) ABSTRACT

Weight loss methods and systems are described. In one embodiment, behavior modification program data indicating participation in a weight loss behavior modification program is recorded. Drug therapy program data indicating drug fulfillment of a weight loss drug therapy program drug is recorded, in which the drug fulfillment of the weight loss drug therapy program drug occurs after participation in the weight loss behavior modification program. Whether a weight loss surgical program criterion has been met is determined based on analysis of the behavior modification program data and the drug therapy program data. The weight loss surgical program criterion is based on the participation in the weight loss behavior modification program and the drug fulfillment of the weight loss drug therapy program drug. A surgical weight loss program approval is generated based on a determination that the surgical weight loss program criterion has been met. Additional methods and systems are disclosed.

23 Claims, 9 Drawing Sheets

WEIGHT LOSS SYSTEMS AND METHODS

FIELD

This application relates generally to weight loss and, more particularly, to methods and systems of administering weight loss programs.

BACKGROUND

Obesity is a significant health risk and can cause and/or contribute to a number of obesity-related conditions, such as hypertension, lipid disease, type two diabetes, cancer, orthopedic conditions, and other diseases. The treatment of such obesity-related conditions can often be expensive over the course of the person's life.

Individuals who are over-weight, obese, or who would otherwise benefit from weight loss programs may participate in a weight loss program, such as a program offered under the trade name Weight Watchers.

DETAILED DESCRIPTION

Figure 1:
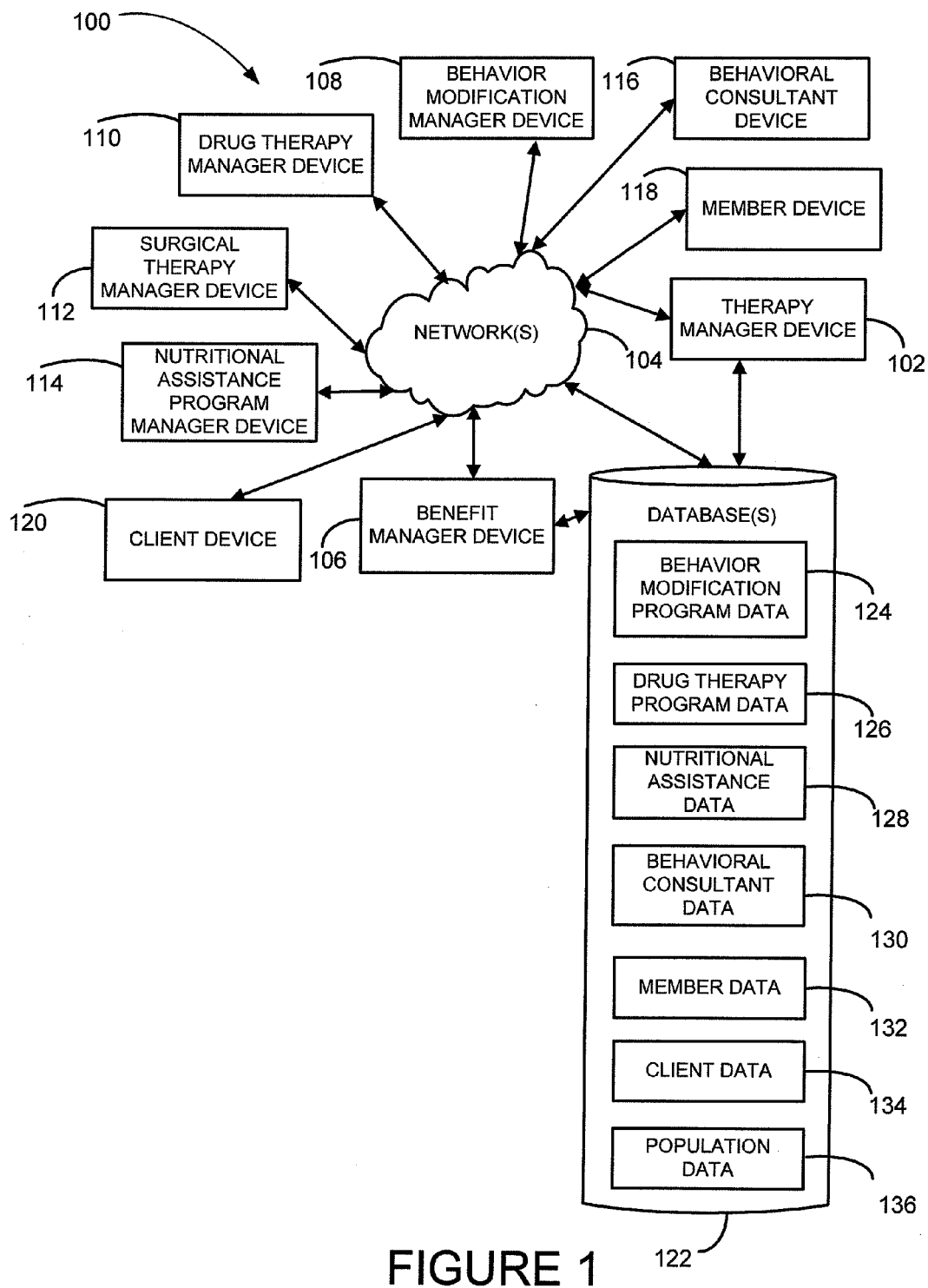
FIG. 1 is a block diagram of an example system, according to an example embodiment.

Example methods and systems for promoting weight loss and/or improving the likelihood of successful weight loss are disclosed. In the following description, for purposes of explanation, numerous specific details are set forth in order to provide a thorough understanding of example embodiments. It will be evident, however, to one of ordinary skill in the art that embodiments of the invention may be practiced without these specific details.

The methods and systems are directed to programs for administering weight loss programs and/or processing claims in connection with a weight loss program or other wellness program.

In general, a client engages a pharmacy benefit manager (PBM) to offer a drug benefit program. Examples of clients include governmental organizations (e.g., Federal government agencies, the Department of Defense, the Centers for Medicare and Medicaid Services and state government agencies), middle market companies, large national employers, health insurance companies that have carved out the drug benefit, and the like. A person who is a participant or member of a drug benefit program offered by the client may obtain prescription drugs according to pricing, pharmacy selection, rebates, discounts and the like provided by the terms of the drug benefit program.

The client's offered drug benefit program may be a stand-alone drug benefit operated by the PBM, or as part of a health care benefit operated by a health insurance company where the PBM services are offered directly by the health insurance company or offered indirectly by the PBM on behalf of the health insurance company.

In addition to drug benefit programs, the PBM may offer additional benefit programs, and/or adjudicate claims for the additional benefit programs. Examples of the additional benefit programs may include discounts, reimbursements, and rebates for various health-related and/or weight loss programs. Examples of such health-related and/or weight loss programs may include gym memberships, nutritional counseling and/or guidance, behavioral consultation and modification programs, and the like. Such additional benefit programs may be offered, for example, in recognition that weight loss may mitigate future health conditions of members, e.g., which may result from and/or be correlated with excessive weight and/or obesity. The mitigation of such weight-related health conditions may allow clients to realize a savings in expenditures on drugs and medical services related to the treatment of the weight-related health conditions.

In general, the methods and systems may include administering a weight loss step therapy in which a participation by a member in one, or more than one, of a series of weight loss programs is approved based on participation by the member in one, or more than one, prior weight loss programs.

In addition, the methods and systems may include methods of processing wellness claims associated with one or more wellness therapy program, such as a weight loss program.

In general, a weight loss program is a program that includes, as an objective, weight loss and/or reduction in obesity-related conditions by participants in the program. A variety of treatments, techniques, and/or methods may be used or employed in a weight loss program. For example, various weight loss programs may include approaches such as: (a) weight loss behavior modification programs; (b) weight loss drug therapy programs; and (c) weight loss surgical programs. Other varieties of weight loss programs and/or aspects of weight loss programs, may include, for example, nutritional assistance programs and behavioral consultant programs.

In some embodiments, the implementation of a weight loss step therapy program for those members who seek and/or would benefit from treatment for weight loss and/or by implementing systems and methods for processing wellness claims resources may be more efficiently utilized. For example, in some embodiments, relatively lower cost weight loss programs may be initially implemented. In some embodiments, higher cost weight loss program may be subsequently implemented in the event that previously implemented weight loss programs do not provide a desired degree of efficacy.

FIG. 1 is a block diagram of an example system 100, according to an example embodiment. The system 100 is an example environment in which a weight loss program may be implemented and/or in which wellness claims may be processed. The system 100 includes a therapy manager device 102 in communication with a benefit manager device 106 over a network 104.

The therapy manager device 102 is a device operated by an entity at least partially responsible for creation and/or management of weight loss therapies for a client on behalf of members.

The entity that operates a therapy manager device 102 may create and/or administer a weight loss step therapy program. For example, at least three weight loss programs may be implemented as steps in a in weight loss step therapy program. In some embodiments, the order of implementation of the weight loss programs included within the weight loss step therapy program may be defined. In some embodiments, one or more criterion may be established to indicate participation by a member in a weight loss program. Approval for a member to participate in one, or more than one, subsequent weight loss programs may be granted or denied based on whether the member is determined to have participated in one or more prior weight loss programs, based on the order of implementation of the weight loss programs included within the weight loss step therapy program.

The operator of the therapy manager device 102, and/or an entity acting on behalf of the operator of the therapy manager device 102, may record data regarding participation by the member in a first weight loss program and may determine whether one or more criterion for participation in a second weight loss program has been met, based on an analysis of the recorded data. If the criterion has been met, the operator of the therapy manager device 102 may generate an approval for the member to participate in the second weight loss program.

The network 104 by which the therapy manager device 102 communicates with the benefit manager device 106 may include, by way of example, Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. Network 104 may also include optical communications. Other conventional and/or later developed wired and wireless networks may also be used.

The benefit manager device 106 is a device operated by an entity at least partially responsible for the management of a drug benefit program and/or additional benefit programs. While the entity operating the benefit manager device 106 is typically a PBM, other entities may operate the benefit manager device 106 either on behalf of themselves, the PBM, or another entity.

Some of the operations of the PBM that operates the benefit manager device 106 may include the following. A member attempts to participate in a wellness therapy program, such as a weight loss program or other wellness program. The wellness therapy program vendor then submits a claim to the PBM. The PBM performs certain adjudication functions including verifying the eligibility of the member for the weight loss program or other wellness program, reviewing a formulary to determine appropriate co-pay, coinsurance, and deductible for the wellness therapy program, and, if applicable, performing an interactions review (such as a drug utilization review (DUR)) on the member. The PBM then adjudicates the claim associated with the weight loss program and provides a response to the wellness therapy program vendor following performance of the aforementioned functions. If the claim is successfully adjudicated, the client and/or member (or the entity on behalf of the client and/or member) ultimately reimburses the wellness therapy program vendor for providing the wellness therapy program.

A vendor of a wellness therapy program, such as a weight loss program may operate a device. Vendor devices may include, by way of example, a behavior modification manager device 108, a drug therapy manager device 110, a surgical therapy manager device 112, a nutritional assistance program manager device 114, and/or a behavior consultant device 116. Each vendor device may be in communication with a therapy manager device 102 and/or a benefit manager device 106 over a network 104.

A behavior modification manager device 108 may be operated by an entity that provides and/or administers a weight loss behavior modification program.

A weight loss behavior modification program generally refers to a weight loss program in which achieving a weight loss objective is expected to be due at least in part to modification of at least one aspect of an individual's behavior, such as amount and/or quality of exercise, amount and/or quality of food intake, and/or modification of cognitive behavior relating to food intake, exercise, and the like. Examples of weight loss behavior modification programs are those offered under the trade names Weight Watchers, PeerTrainer, Eat Smart, Move More, Weigh Less, and other programs (such as locally-offered programs) directed to training an individual to improve his or her diet and/or exercise. A weight loss behavior modification program may include diet and/or exercise programs established for a particular member and/or set of members.

A drug therapy manager device 110 may be operated by an entity that provides and/or administers a weight loss drug therapy program.

In general, weight loss drug therapy programs may include over-the-counter and/or prescription drugs as a component of the program. For example, weight loss drug therapy programs may include prescriptions for drugs established to promote weight loss, such as phentermine, orlistat, or diethylpropion. Use of other drugs may be employed in a weight loss drug therapy program. Weight loss drug therapy programs may also include behavior modification components, such as those that may be included in a weight loss behavior modification program. In some embodiments, the behavior modification components associated with a weight loss drug therapy program may include pharmaceutically mediated behavior modification, e.g., through the use of antidepressants, and the like.

An entity that provides and/or administers a weight loss surgical program may operate a surgical therapy manager device 112.

Weight loss surgical programs include laparoscopic gastric banding and gastric bypass surgery. Other surgical techniques may be employed in a weight loss surgical program. Weight loss surgical programs may also include behavior modification components, such as those that may be included in a weight loss behavior modification program. For example, in some embodiments, behavior modification components associated with a weight loss surgical programs may include behavior modifications that may be directed at increasing the efficacy and/or safety of weight loss surgical programs.

The device operator of a nutritional assistance manager device 114 may be an entity that provides and/or administers a nutritional assistance program.

Examples of nutritional assistance programs may include those offered under the trade names Jenny Craig and Nutrisystem and other weight loss programs in which portion-specific food is used by program participants. For example, in a Nutrisystem program, a participant may receive a set of pre-packaged, individually-portioned food in exchange for a monthly (or other periodic) fee. Other examples of nutritional assistance programs may include, for example consultation and/or instruction provided by a dietician and/or nutritionist. A nutritional assistance program may also include other behavior modification components, such as those that may be included in a weight loss behavior modification program. For example, behavior modification components associated with a nutritional assistance programs may include behavior modification associated with food selection, portion control, and the like.

More than one entity may provide and/or administer a particular weight loss program and, therefore, more than one entity may operate a vendor device associated with a weight loss program, such as devices 108-114. For example, a weight loss drug therapy program may be administered in part by a physician and in part by a pharmacy at which a prescription for a weight loss prescription drug is presented.

A behavior consultant device 116 may be operated by an entity (e.g., a behavior consultant) that provides weight loss behavioral analysis and/or other consultation services. For example, a behavior consultant may perform an analysis of a work location associated with a particular member or set of members. The work location may be operated by a company that employs the member or that is otherwise associated with a work location of the member.

A behavior consultant may make recommendations directed to design, adaptation, and/or use of physical space, such as: placement of stairs to encourage use; reduction in speed and/or availability of elevators to discourage use; designation of walking paths; facility design adapted to increase walking distances, e.g., from a parking lot to a building; inclusion of a gym or other work-out space within the facilities; and promoting choices that increase physical activity, such as encouraging stand-up or walking meetings.

A behavior consultant may also offer food choice recommendations, which may be implemented in a client-provided eating space, such as a cafeteria, or which may be otherwise implemented, such as modifying food placement to promote healthier food choices. For example, placement of fresh fruit near a check out station of a cafeteria, at eye level, and/or that is otherwise attractive and noticeable, may promote more selections of fresh fruit; placement of poorer nutritional choices, such as chips and sweets, in a less-prominent and/or less convenient location may diminish selection of those items. Other food choice recommendations may include providing smaller-sized plates or trays, which may encourage reduced portions and/or a reduction in the number of items selected; providing smaller portions of foods that are poorer nutritional choices and/or providing larger portions of foods that are favored nutritional choices; implementing pricing differentiation to encourage healthy food choices, such as lowering the price of fruits and vegetables and raising the price of fried foods and sweet; and/or reviewing vending machine selections, and, if appropriate, suggesting changes to smaller-sized portions and/or healthier options.

A behavior consultant may suggest that a company offer incentive programs such as supplementing a gym membership and/or providing rewards for documented improvements and/or achievements, such as improvements in healthy living choices, achievements in obtaining appropriate preventative care, and/or other improvements or achievements which may promote weight loss, a healthy diet, and/or increased exercise.

The member device 118 is used by a device operator. The device operator may be a member that is either a participant in a wellness therapy program or a beneficiary of the participant (e.g., a spouse or a child of the beneficiary). However, the device operator may be another person operating the member device 118 on behalf of the member. Examples of such people include parents, guardians and caregivers. A device operator may use the member device 118 to receive and/or generate communications with a therapy manager device 102, a benefit manager device 106, a vendor device 108-116 (e.g., a device operated by a vendor of a wellness therapy program in which the member is participating and/or may participate), a client device 120, and/or any combination of the foregoing.

A client of an entity operating a therapy manager device 102 and/or a benefit manager device 106 may operate a client device 120. Examples of clients include governmental organizations (e.g., Federal government agencies, the Department of Defense, the Centers for Medicare and Medicaid Services and state government agencies), middle market companies, and large national employers. A device operator may use the client device 120 to receive and/or generate communications with a therapy manager device 102, a benefit manager device 106, a vendor device 108-116 (e.g., a vendor device operated by a vendor of a wellness therapy program offered to members associated with the client), a member device 118, and/or any combination of the foregoing.

One or more of the therapy manager device 102, the benefit manager device 106, the behavior modification manager device 108, the drug therapy manager device 110, the surgical therapy manager device 112, the nutritional assistance program manager device 114, the behavior consultant device 116, the member device 118, and/or the client device 120 may be in communication directly (e.g., through local storage) and/or through the network 104 (e.g., in a cloud configuration or software as a service) with a database 122. Other databases may be provided. The database 122 may store behavior modification program data 124, drug therapy program data 126, nutritional assistance data 128, behavioral consultant data 130, member data 132, client data 134, and population data 136.

The behavior modification program data 124 includes information about a weight loss behavior modification program and/or the participation by a member in such a program. Examples of behavior modification program data 124 that may indicate participation by a member in a program include attendance records, weight loss records, exercise reporting records, dietary records, reports from a person and/or entity administering a weight loss behavior modification program, and/or other information.

Drug therapy program data 126 includes information about a weight loss drug therapy program and/or participation by a member in such a program. Examples of drug therapy program data 126 that may indicate participation by a member in a weight loss drug therapy program include prescription claims data, receipts for purchases of over-the-counter drugs, certification of participation by a person and/or entity administering a weight loss drug therapy program, and the like.

Nutritional assistance data 128 includes information about a nutritional assistance program and/or a member's participation in such program. Nutritional assistance data 128 may include, by way of example, information that indicates participation by a member in a weight loss behavior modification program such as information about food orders by a member, certification of participation by a person and/or entity administering a nutritional assistance program, and the like.

Behavior consultant data 130 includes information about recommendations by a behavioral consultant to a company (such as a client) and/or implementation of such recommendations by a company.

The member data 132 includes information about participants and/or prospective participants in a wellness therapy program, such as a weight loss program, such as members associated with a client. Examples of the member data 132 include name, address, telephone number, e-mail address, prescription drug history, and the like. The member data 132 may include a client identifier that identifies the client associated with the member and/or a member identifier that identifies the member to the client. Member data may also include data received in connection with participation by a member in a wellness therapy program, such as a weight loss program. The member data 132 may include member directed data. The member directed data may include self-report data or feed data that is provided from a vendor of a wellness therapy program. The member directed data may include fitness related data (e.g., visits to a workout facility, exercises performed during a workout routine, etc.), nutrition related data (e.g., meals and foods), and the like.

The client data 134 includes information regarding the clients of the therapy manger and/or the benefit manager. Examples of the client data 134 include company name, company address, contact name, contact telephone number, contact e-mail address, and the like. Client data 134 may also include information regarding a wellness therapy program, such as a weight loss program, that has been selected by a client.

The population data 136 includes information about a population of individuals, such as members associated with a client. Population data 136 may include demographics data and/or population prescription history data, and/or population past prescription behavior data. The population may include all or a subset of members associated with a particular client. Other populations may be used such as populations with particular obesity-related conditions, who have participated in particular weight loss programs, or who otherwise meet certain demographic criteria.

Examples of the therapy manager device 102 and/or devices 106-120 include a gaming unit, a mobile phone, a personal digital assistant (PDA), a display device, a generic or specialized computing system, or the like. Other devices may also be used. The therapy manager device 102, the benefit manager device 106, the behavior modification manager device 108, the drug therapy manager device 110, the surgical therapy manager device 112, the nutritional assistance program manager device 114, the behavior consultant device 116, the member device 118, and/or the client device 120 may each use the same type of device, or may use different types of devices.

The therapy manager device 102 may be in a client-server relationship with the benefit manager device 106, the behavior modification manager device 108, the drug therapy manager device 110, the surgical therapy manager device 112, the nutritional assistance program manager device 114, the behavior consultant device 116, the member device 118, and/or the client device 120; a peer-to-peer relationship with the benefit manager device 106, the behavior modification manager device 108, the drug therapy manager device 110, the surgical therapy manager device 112, the nutritional assistance program manager device 114, the behavior consultant device 116, the member device 118, and/or the client device 120; or in a different type of relationship with the benefit manager device 106, the behavior modification manager device 108, the drug therapy manager device 110, the surgical therapy manager device 112, the nutritional assistance program manager device 114, the behavior consultant device 116, the member device 118, and/or the client device 120.

While the system 100 in FIG. 1 is shown to include single devices 102, 106-120 multiple devices may be used. The devices 102, 106-120 may be the same type of device or may be different device types. When multiple devices are present, the multiple devices may be of the same device type or may be a different device type. Moreover, system 100 shows a single network 104; however, multiple networks can be used. The multiple networks may communicate in series with each other to link the devices 102, 106-120 or in parallel to link the devices 102, 106-120.

Figure 2:
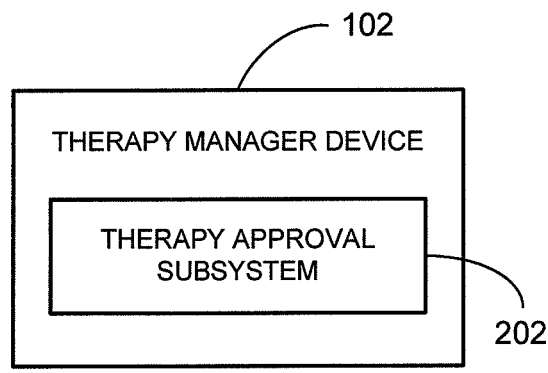
FIG. 2 illustrates an example therapy manager device that may be deployed in the system of FIG. 1, according to an example embodiment.

FIG. 2 illustrates the therapy manager device 102, according to an example embodiment. The therapy manager device 102 may be used by an entity in connection with the administration of a weight loss step therapy program. The therapy manager device 102 may be deployed in the system 100, or may otherwise be used.

The therapy manager device 102 as shown in FIG. 2 may include a therapy approval subsystem 202.

The therapy approval subsystem 202 enables the operator of the therapy manager device 102 to record data indicating sequential participation by a member in weight loss programs, such as a weight loss behavior modification program and a weight loss drug therapy program. The recorded data may enable a determination of whether the member has satisfied one or more criterion for participation in an additional weight loss program, such as a weight loss surgical program. An approval for participation in the additional weight loss program may be generated if such criterion has been met.

In an example embodiment, steps of a weight loss step therapy program administered by a therapy manager may include a weight loss behavior modification program, a weight loss drug therapy program, and a weight loss surgical program. Steps may be identified by reference to a formulary or may be otherwise identified.

Programs identified as weight loss programs of a step therapy weight loss program may be more broadly or narrowly defined. For example, instead of identifying a weight loss behavior modification program as a first step, a first step may be more narrowly defined as a program offered under the trade name Weight Watchers.

Weight loss step therapy programs may employ one or more pre-existing weight loss programs and/or may employ one or more weight loss programs designed and/or adapted for a particular embodiment of a weight loss step therapy program. For example, in some embodiments, a weight loss step therapy program may vary for different members based on considerations such as weight loss goals of the member, medical conditions and/or medical history of the member, prior weight loss programs in which the member has participated, and the like. In some embodiments, the weight loss step therapy program may vary based on client preferences, and the like.

A weight loss step therapy program includes a sequence for participation in the weight loss programs of the weight loss step therapy program. By way of example, a sequence may be: weight loss behavior modification program, then weight loss drug therapy program, and then weight loss surgical program. By way of another example, a sequence may be weight loss behavior modification program, then nutritional assistance program, then weight loss drug therapy program, and then weight loss surgical program. By way of further example, a sequence may be Weight Watcher program, then Nutrisystem program, then weight loss drug therapy program, and then weight loss surgical program. In yet another example, a sequence may be a behavior consultant program, then weight loss behavior modification program, then weight loss drug therapy program, and then weight loss surgical program. In another example, a sequence may be weight loss behavior modification program, then behavior consultant program, then weight loss drug therapy program, and then weight loss surgical program The steps of a weight loss step therapy program may be selected by a therapy manager, a benefit manager, and/or a client, or may be otherwise selected. Selection of weight loss programs as steps in a weight loss step therapy program may be based on factors such as likelihood of successful long-term weight loss, cost considerations, efficient allocation of resources, and/or geographic availability. Other factors may be used.

A weight loss behavior modification program may be less expensive than other weight loss programs. Furthermore, some weight loss programs, such as weight loss drug therapy programs and weight loss surgical programs, may have a higher likelihood of success when provided to an individual who has received behavior modification training, e.g., via a weight loss behavior modification program. Thus, requiring completion and/or participation in a weight loss behavior modification program as a precondition to granting approval for participation in a weight loss drug therapy program may increase the likelihood that the programs may achieve a desired weight loss objective and/or may result in a more efficient allocation of resources. For example, some members may achieve successful weight loss from a weight loss behavior modification program alone, thereby obviating a the weight loss drug therapy program.

Figure 3:
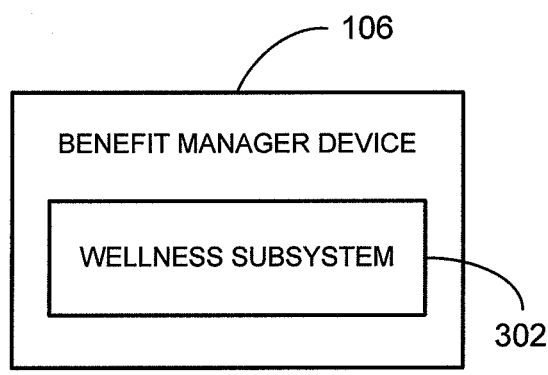
FIG. 3 illustrates an example benefit manager device that may be deployed in the system of FIG. 1, according to an example embodiment.

FIG. 3 illustrates the benefit manager device 106, according to an example embodiment. The benefit manager device 106 may be used by the PBM in connection with the management of one or more wellness therapy programs, such as weight loss programs and/or other programs designed to improve a physical and/or mental well-being of a member, such as employee assistance programs and the like. The benefit manager device 106 may be deployed in the system 100, or may otherwise be used.

The benefit manager device 106 as shown in FIG. 3 may include a wellness subsystem 302.

The wellness subsystem 302 enables the operator of the benefit manager device 106 to receive a wellness claim associated with a member, wherein the wellness claim is associated with a wellness therapy program managed by the PBM. The wellness subsystem 302 may enable adjudication of the wellness claim. A response to the member's claim may be generated based on the adjudication.

Figure 4:
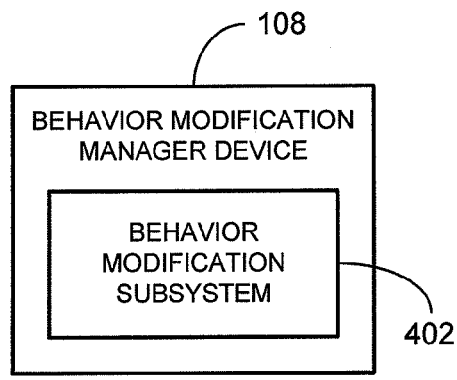
FIGS. 4-8 illustrate example vendor devices that may be deployed in the system of FIG. 1, according to an example embodiment.

The behavior modification manager device 108 as shown in FIG. 4 may include a behavior modification subsystem 402.

The behavior modification subsystem 402 enables the device operator to generate behavior modification program data 124 that includes information about participation of a member in a weight loss behavior modification program administered by the device operator. Behavior modification program data 124 may be transmitted, e.g., via a user interface, to a therapy manager device 102 or a benefit manager device 106, or may be otherwise transmitted.

A behavior modification program notification may be generated at the behavior modification subsystem 402, or may be otherwise generated. The behavior modification program notification may include, by way of example, a weight loss behavior modification program participation notification or a weight loss behavior modification program completion modification.

Other behavior modification program data 124 reflecting satisfactory participation of a member in a weight loss behavior modification program may be generated at the behavior modification subsystem 402, or may be otherwise generated. An example of behavior modification program data 124 may include member biometrics, e.g., weight, BMI, cholesterol levels, blood pressure, and the like.

A device operator may receive communications at the behavior modification subsystem 402, e.g., via a user interface. For example, a prior authorization, payment information, and/or other information may be received from the therapy manager device 102, the benefit manager device 106, the client device 118, the member device 120, or otherwise.

Figure 5:
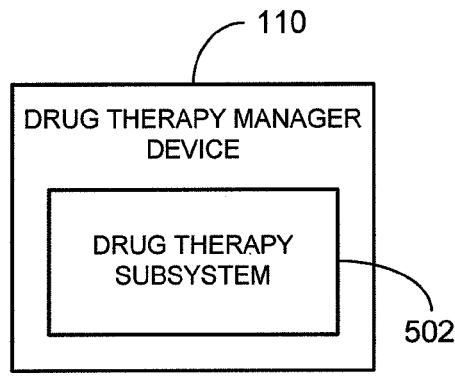

FIG. 5 illustrates a drug therapy manager device 110. The drug therapy manager device 110 may include a drug therapy subsystem 502.

The drug therapy subsystem 502 enables the device operator to generate drug therapy program data 126 that includes information about participation by a member in a weight loss drug therapy program administered by the device operator. Drug therapy program data may include information indicating drug fulfillment on behalf of the member of a drug associated with a weight loss drug therapy program. Drug therapy program data 126 may be transmitted, e.g., via a user interface, to a therapy manager device 102 or a benefit manager device 106, or may be otherwise transmitted.

A drug therapy program notification may be generated at the drug therapy subsystem 502, or may be otherwise generated. The drug therapy program notification may include, by way of example, a weight loss drug therapy program participation notification, a weight loss drug therapy program completion modification, or other information about participation by a member in a weight loss drug therapy program, such as claims data for drugs prescribed in connection with the weight loss drug therapy program and/or an MPR (medication possession ratio), which is a measure that captures a gap in therapy and can be used to measure adherence.

A device operator may receive communications at the drug therapy subsystem 502. For example, a prior authorization, payment information, and/or other information may be received from the therapy manager device 102, the benefit manager device 106, the client device 118, the member device 120, or otherwise.

Figure 6:
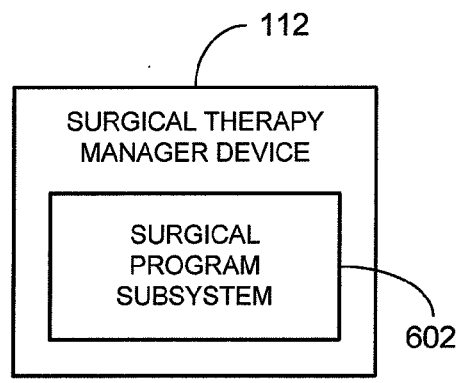

A surgical therapy manager device 112, as illustrated in FIG. 6, may include a surgical program subsystem 602. An operator of the surgical therapy manager device 112 may receive communications at the surgical program subsystem 602. For example, a prior authorization, payment information, and/or other information may be received from the therapy manager device 102, the benefit manager device 106, the client device 118, the member device 120, or otherwise. Data, such as member data 132 that includes information about participation by a member in a weight loss surgical program, may be generated at the surgical program subsystem 602.

Figure 7:
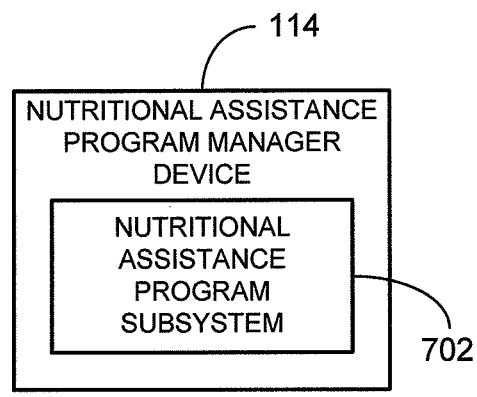

FIG. 7 illustrates a nutritional assistance program manager device 114. The nutritional assistance program manager device 114 may include a nutritional assistance program subsystem 702.

The nutritional assistance subsystem 702 enables the device operator to generate nutritional assistance data 128 that includes information about participation by a member in a nutritional assistance program administered by the device operator. Nutritional assistance data 128 may be transmitted, e.g., via a user interface, to a therapy manager device 102 or a benefit manager device 106, or may be otherwise transmitted.

A nutritional assistance program notification may be generated at the nutritional assistance subsystem 702, or may be otherwise generated. The nutritional assistance program notification may include, by way of example, a nutritional assistance program participation notification or other information about participation by the member in a nutritional assistance program, such as delivery information for at least some of the meals associated with the nutritional assistance program.

A device operator may receive communications at the nutritional assistance subsystem 702. For example, a prior authorization, payment information, and/or other information may be received from the therapy manager device 102, the benefit manager device 106, the client device 118, the member device 120, or otherwise.

Figure 8:
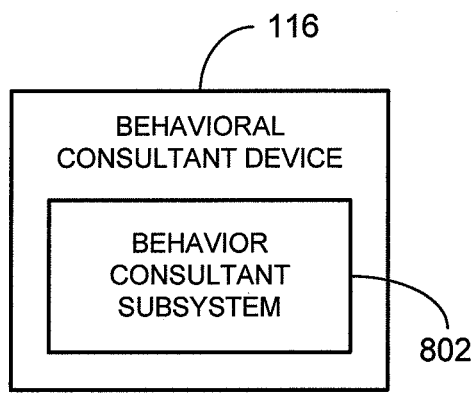

The behavior consultant device 116, as illustrated in FIG. 8, may include a behavior consultant subsystem 802. A device operator may use the behavior consultant subsystem 802 to generate behavioral consultant data 130, such as data that reflects a behavioral consultant's analysis and/or recommendations. Information about participation by a company in a behavioral consultant program may be generated at a behavioral consultant subsystem 802, or may be otherwise generated. Such information may include a behavioral consultant program notification and/or other information regarding implementation of at least some recommendations of a behavioral consultant. The behavioral consultant modification program notification may include, by way of example, a behavioral consultant program participation notification or a behavioral consultant program completion modification.

Behavioral consultant program data 132 may be transmitted, e.g., via a user interface, to a therapy manager device 102 or a benefit manager device 106, or may be otherwise transmitted.

Recommendations of a behavioral consultant may be generated at a behavior consultant device. Recommendations may be directed to all members associated with client, e.g., all members, regardless of whether weight loss is an appropriate objective, or to a targeted group of members.

While the various subsystems 202, 302, 402, 502, 602, 702, and 802 have been described as being deployed on separate devices 102 and 106-116, more than one of the subsystems may be deployed on a single device. Additionally/alternatively, in some embodiments the functionality provided by the subsystems may be combined into fewer subsystems and/or may be divided into a greater number of subsystems.

Figure 9:
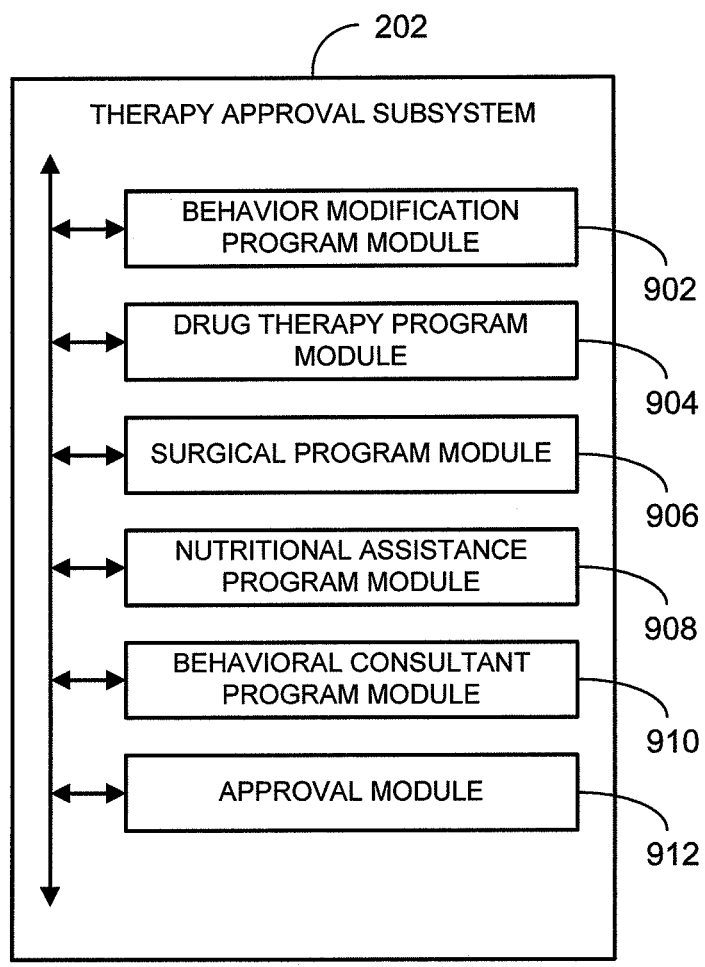
FIG. 9 is a block diagram of an example therapy approval subsystem that may be deployed within the therapy manager device of FIG. 2, according to an example embodiment.

FIG. 9 illustrates a therapy approval subsystem 202 that may be deployed in the therapy manager device 102, the benefit manager device 106, or otherwise deployed in another system. One or more modules are communicatively coupled and included in the therapy approval subsystem 202 to enable administration of a weight loss step therapy program. The modules of the therapy approval subsystem 202 that may be included are a behavior modification program module 902, drug therapy program module 904, surgical program module 906, a nutritional assistance program module 908, a behavioral consultant program module 910, and an approval module 912. Other modules may also be included.

In some embodiments, the modules of the therapy approval subsystem 202 may be distributed so that some of the modules are deployed in the therapy manager device 102 and some modules are deployed in the benefit manager device 106 and/or deployed in another device. In one embodiment, the modules are deployed in memory and executed by a processor coupled to the memory. The functionality contained within the modules 902-912 may be combined into a lesser number of modules, further divided among a greater number of modules, or redistributed among existing modules. Other configurations including the functionality of the modules 902-912 may be used.

The behavior modification program module 902 receives the behavior modification program data 124 through a user interface, from a behavior modification program manager device 108, or otherwise. The behavior modification program module 902 may record behavior modification program data 124 that reflects participation by a member in a weight loss behavior modification program. In some embodiments, the behavior modification program module 902 receives a behavior modification program notification, e.g., from the behavior modification program manager device 108, and records behavior modification program data based on the receipt of that notification.

The behavior modification program module 902 may transmit approvals, e.g., approvals generated by approval module 912, to a behavior modification manager device 108, to a benefit manager device 106, or to another device. The approval may include a benefit amount and/or may authorize member benefits to be provided to the member by a behavior modification manager associated with the behavior modification manager device. Member benefits may include a member discount, payment to the behavior modification manager, and/or other benefits.

The behavior modification program module 902 may be used to determine whether the member has previously participated in another program, such as a behavioral consultant program. For example, the determination may be made based on whether behavioral consultant data is recorded before or after behavior modification program data.

Drug therapy program data 126 is received by and recorded at the drug therapy program module 904. Recorded drug therapy data 126 may include information about drug fulfillment on behalf of a member of a drug associated with a weight loss therapy program. Drug therapy program data 126 may be received via a user interface, from a drug therapy manager device 110, from the benefit manager device 106, or may be otherwise received. The drug therapy program module 904 may be used to establish whether participation by a member in another weight loss therapy program (such as a weight loss behavior modification program, a nutritional assistance program, a behavioral consultant program, or other weight loss program) occurred before or after participation by the member in a drug therapy program.

Approvals related to a weight loss drug therapy program, e.g., approvals generated by approval module 112, may be transmitted by the drug therapy program module 904. Transmissions to be made, by way of example, to a benefit manager device 106 or to a vendor device such as a drug therapy manager device 110. An approval transmitted to a benefit manager device 106 may include an authorization for adjudication of a claim associated with a weight loss drug therapy program by the benefit manager.

The surgical program module 906 may be used to establish or otherwise receive one or more weight loss surgical program criterion. Weight loss surgical program criteria may be received via a user interface, from a client device 120, from a benefit manager device 106, or may be otherwise received. Weight loss surgical program criteria may be based on a participation by a member in one or more other weight loss programs. For example, criteria may include prior participation by the member in one or more of a weight loss behavior modification program, a nutritional assistance program, a behavioral consultant program, a drug therapy program, or other weight loss program. One or more other weight loss surgical program criterion may be established at a weight loss surgical program module 906.

The surgical program module 906 may transmit approvals, e.g., approvals generated by approval module 912. Approvals may be transmitted, by way of example, to a surgical therapy manager device 112, to a benefit manager device 106, or to another device. The approval may include a benefit amount and/or may authorize member benefits to be provided to the member by a weight loss surgical therapy vendor. The surgical program module 906 may record a surgical weight loss program prior authorization based on generation of an approval.

The nutritional assistance program module 908 receives the nutritional assistance program data 128 through a user interface, from a nutritional assistance program manager device 114 or otherwise. The nutritional assistance program module 908 may record nutritional assistance program data 128 that reflects participation by a member in a nutritional assistance program. In some embodiments, the nutritional assistance program module 908 receives a behavior modification program notification, e.g., from the nutritional assistance program manager device 114, and records nutritional assistance program data based on the receipt of that notification.

The nutritional assistance program module 908 may transmit approvals, e.g., approvals generated by approval module 912, to a nutritional program manager device 114, to a benefit manager device 106, or to another device.

The nutritional assistance program module 908 may be used to determine whether the member has previously participated in another program, such as a behavioral consultant program or a weight loss behavior management program. For example, the determination may be made based on whether nutritional assistance program data is recorded before or after behavior modification program data and/or before or after behavioral consultant data.

Behavioral consultant data 130 is received at the behavioral consultant module 910. The behavioral consultant module 910 may be used to record behavioral consultant data 130, such as data indicating an analysis performed by a behavioral consultant, data indicating implementation of at least some of the suggestions provided by a behavioral consultant, and/or data reflecting satisfactory participation in implementation of at least some of such suggestions.

The behavioral consultant program module 910 receives the behavioral consultant program data 130 through a user interface, from a behavioral consultant device 116 or otherwise. In some embodiments, the behavioral consultant program module 910 receives a behavioral consultant notification and records behavioral consultant program data based on the receipt of that notification.

Determination steps may be performed at the approval module 912, or may be otherwise performed. Broadly speaking, the approval module 912 may perform an analysis to determine whether a criterion for participation in a weight loss program of a weight loss step therapy program has been met based on data recorded at one or more of the behavior modification program module 902, drug therapy program module 904, nutritional assistance program module 908, behavioral consultant module 910, or that is otherwise recorded. Criteria may include participation in another weight loss program, fulfillment of a drug associated with a weight loss drug therapy program, and/or implementation of suggestions made by a behavioral consultant. Other criteria may be used.

The approval module 912 may be used to determine whether participation by a member in a program is satisfactory. A criterion may or may not include achievement of a weight loss goal of the member. Satisfactory participation in a program may require completion of the program, any participation in the program, or a particular degree of participation, such as participation for a period of time, participation sufficient to reach a goal (e.g., a target weight loss, a target change in body mass index (BMI), a target change in cholesterol levels, a target change in blood pressure, and the like), or participation to establish that the member has received sufficient benefits from the weight loss therapy program (e.g., that the member has learned how to engage in proper diet and/or exercise programs, or has otherwise achieved a level of behavior modification).

In some embodiments, time parameters may be included, such that a prior weight loss therapy program must have been completed within a particular time frame (e.g., within 3 months, 6 months, one year, or other period of time) of the request for participation in another weight loss therapy program as a condition to establishing participation in the prior weight loss therapy program. In some embodiments, time parameters may not be included.

An approval for a weight loss program may be generated by the approval module 912 based on data recorded at one or more of modules 902-910 and on determinations made at the approval module 912. An approval may include one of more of the following.

An approval may include approval of coverage of weight loss program under a plan. For example, an approval may be generated and transmitted to a benefit manager device 106 that includes approval to adjudicate a claim associated with a weight loss program, such as a claim for a drug associated with a weight loss drug therapy program. Approvals may be transmitted to a client device 120, a member device 118, and/or one or more of vendor devices 108-116. For example, an approval generated and transmitted to a behavior modification manager device 106 may include enrollment authorization for the member in the weight loss behavior modification program.

An approval may include a determination that a particular level of coverage under a healthcare plan applies. For example, the healthcare plan may provide that a member who has not previously completed a weight loss behavior modification program and then a weight loss drug therapy program but who wishes to participate in a weight loss surgical program may be required to pay 50% of the cost of such program. However, a member who has previously completed a weight loss behavior modification program and then a weight loss drug therapy program may be required to pay only 20% of the cost of such program. In this example, approval (based on participation by a member in the other weight loss programs having been established) may include approval of the reduced co-pay.

An approval module 912 may be used to generate and/or transmit incentives to a member. By way of example, in some embodiments, members may be provided incentives to enroll in a weight loss step therapy program and/or to participate in an initial program of a weight loss step therapy program, such as a weight loss behavior modification program. For example, a client may agree to pay all or part of a cost for participation by the member in such initial program.

In some embodiments, incentives employed in a weight loss step therapy program may include incentives to persist in a weight loss program. For example, financial or other incentives could be awarded to a member based on his or her achievement of designated goals, such as a target weight loss, a target change in body mass index (BMI), a target change in cholesterol levels, a target change in blood pressure, and the like.

One, or more than one, of the behavior modification program module 902, drug therapy program module 904, surgical program module 906, a nutritional assistance program module 908, may receive, record, and/or establish a prior authorization in connection with participation by a member in a weight loss program. A prior authorization may reflect a satisfactory participation by the member in the weight loss program. By way of example, behavior modification program data may include a weight loss behavior modification prior authorization, behavioral consultant data may include a behavioral consultant prior authorization, and/or nutritional assistance data may include a nutritional assistance prior authorization. In such examples, the prior authorization may reflect a satisfactory participation by the member in such program. Satisfactory participation may be based on one or more criterion that are the same as or similar to the criterion that may be used in connection with establishing participation by a member in a program, e.g., one, or more than one, criterion that may be used by an approval module 912, as discussed above.

Prior authorizations may be based on one, or more than one, additional/alternative criterion, such as a body mass index (BMI) of the member; whether the member suffers from obesity-related conditions, such as elevated blood pressure, lipid disease, or type two diabetes; an agreement by the member to provide data regarding his or her participation in such program or to periodically provide other data (such as BMI, weight, and the like); a commitment by the member to participate in a weight loss step therapy program; health-care provider recommendation; or other factors.

Figure 10:
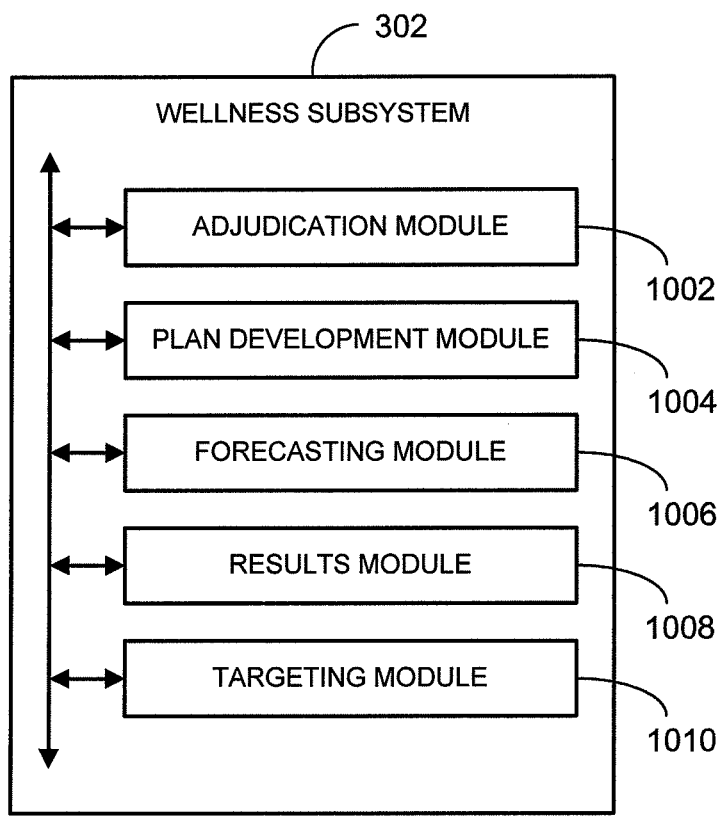
FIG. 10 is a block diagram of an example wellness subsystem that may be deployed within the benefit manager device of FIG. 3, according to an example embodiment.

FIG. 10 illustrates a wellness subsystem 302 that may be deployed in the benefit manager device 106, the therapy manager device 102, or otherwise deployed in another device. One or more modules are communicatively coupled and included in the wellness subsystem 302 to enable a device operator to receive and process a wellness claim. The modules of the wellness subsystem 302 that may be included are an adjudication module 1002, a rules module 1004, a forecasting module 1006, a results module 1008, and/or a targeting module 1010. Other modules may also be included.

In some embodiments, the modules of the wellness subsystem 302 may be distributed so that some of the modules are deployed in the therapy manager device 102 and some modules are deployed in the benefit manager device 106. In one embodiment, the modules are deployed in memory and executed by a processor coupled to the memory. The functionality contained within the modules 1002-1010 may be combined into a lesser number of modules, further divided among a greater number of modules, or redistributed among existing modules. Other configurations including the functionality of the modules 1002-1010 may be used.

A wellness claim may be processed by a device operator at the adjudication module 1002. A wellness claim may include, for example, a claim associated with a weight loss program, such as a claim for coverage under a weight loss behavior modification program, a nutritional assistance program, a weight loss drug therapy program, and/or a weight loss surgical program. Other examples of wellness claims may include claims associated with other programs designed to improve a member's physical and/or mental well-being. Processing steps may include receiving a claim by a member associated with a wellness program, adjudicating the claim, and generating an adjudication response based on adjudicating the wellness claim. A wellness claim may be received via a user interface, from a member device 118, from a client device 120, or may be otherwise received. In some examples, a wellness claim is received from a vendor that is in a network of approved wellness vendors. Network vendors may provide price guarantees and/or discounted prices to members.

Adjudication of a wellness claim may further include determining member eligibility of the member; analyzing a wellness formulary associated with the wellness claim to determine an amount of a member co-pay for the wellness claim; determining a member deductible associated with the wellness claim; and performing an interactions review (such as a DUR) on the member based on the wellness claim.

In some embodiments, adjudicating the wellness claim may include one, or more than one, of determining a member responsibility amount associated with the wellness claim; determining a client responsibility amount associated with the wellness claim; and/or determining a vendor payment amount associated with the wellness claim.

By way of example, a weight loss behavior modification program, e.g., a Weight Watchers program, may normally cost $60 per month. A client may offer to provide the weight loss training program to members for a member co-pay (e.g., a member responsibility amount) of $30 per month. The remaining $30 may be the client responsibility amount, in which case the vendor payment amount will be $60. In other embodiments, however, vendor offers the program to members at a discount so, by way of example, the vendor may discount its normal cost to $50 such that the client responsibility amount will be $20, in an embodiment in which the member co-pay is $30 per month.

In an example embodiment, a nutritional assistance program vendor price may be $120 per month. In an example in which a monthly food bill for a member would be around $100 per month, a member responsibility amount may be $100 per month (e.g., the amount of a monthly food bill for the member). The client responsibility amount may be the $20 difference. In an example embodiment, the vendor may provide a discount for the nutritional assistance program. In such an embodiment, the client responsibility and/or the member responsibility may be decreased.

A client responsibility amount and/or a member responsibility amount may be determined in part based on whether the client has implemented suggestions provided by a behavioral consultant.

An adjudication response may be transmitted by the adjudication module 1002 to one or more of the devices 108-120 and/or to the therapy manager device 102. For example, an adjudication response generated in connection with a wellness claim associated with a weight loss behavior modification program may be transmitted to a behavior modification program manager device 108, to a member device 118, to a client device 120, or may be otherwise transmitted.

The adjudication response may include an amount due from the client and/or from the member, and/or may include an amount due to a vendor associated with the wellness therapy program. By way of example, the response may include a client responsibility amount, a member responsibility amount, and/or a vendor payment amount established as described above.

Other functionalities enabled by the adjudication subsystem 1002 may include providing explanations of wellness program benefits; receiving and responding to requests for prior authorization of participation in a wellness therapy programs; payment of claims associated with wellness therapy programs, when appropriate based on the plan; and other claim administration and/or adjudication services.

In an example, processing a wellness claim at an adjudication module 1002 includes receiving a prior authorization request for a surgical weight loss program. The member with whom the prior authorization request is associated may be identified. The client associated with the member may be identified. Prior authorization information associated with the member may be accessed. A prior authorization response may be generated based on the prior authorization information. The adjudication module 1002 may provide additional and/or alternative functionality.

One or more criterion to be used in connection with adjudicating a wellness claim, e.g., by the adjudication module 1002, may be received by the rules module 1004. For example, a network of preferred wellness therapy program vendors may be received and/or a wellness formulary may be received. A preferred vendor network and/or a wellness formulary may be established by the client, the benefit manager, or may otherwise be established.

In an example, a formulary for weight loss behavior modification programs includes a particular weight loss behavior modification program and a designated formulary position for such weight loss program. For example, the formulary position may be described as limited, preferred, or exclusive. A limited formulary position may be a formulary position in which the particular program is one of several in a category of weight loss programs (e.g., the category of weight loss behavior modification programs). A preferred formulary position may be a formulary position in which the particular program is one of two programs within a category of weight loss programs. An exclusive formulary position may be a formulary position in which the particular program is the only program in a category of weight loss programs.

A co-pay required by a member may be a component of a formulary. For example, a moderate benefit co-pay design may refer to a co-pay design in which there is little or no differentiation between formulary and non-formulary programs. A high benefit co-pay design may refer to a co-pay design in which the co-pay differential between formulary and non-formulary drugs reaches a designated threshold (e.g., $5, $10, or other threshold amount). A closed benefit co-pay design may refer to a co-pay design in which a member must pay 100% of the cost of a non-formulary program.

A network of preferred vendors of wellness therapy programs may be received by the rules module 1004, e.g., via a user interface, from the client device 120, or otherwise. By way of example, a select group of vendors may be identified as preferred providers for weight loss surgical therapy programs, based on parameters likely to indicate provision of a high degree of care by such providers. Co-pay design may be employed to promote selection of a preferred provider, e.g., via a co-pay design in which a member must pay 100% of the cost of a program provided by a non-preferred provider. A preferred vendor may offer its services to members associated with a particular client at a discount.

The forecasting module 1006 determines forecasting associated with member involvement in a wellness therapy program. The forecasting may include a probability of successful completion of the surgical weight loss program of a member. The probability associated with a single member, a set or selection of members, or all members may be forecasted.

In some embodiments, the forecasting module 1006 may be deployed in a therapy manager device 102 and approval may be generated based on the probability of successful completion by the member in one or more weight loss program, such as the steps prior to surgical weight loss program in a weight loss step therapy program.

In some embodiments, claims information for a member may be included in the member data 132, and may be accessed and a determination of the forecasting may be made based on the claims information associated with the member.

In some embodiments, the forecasting module 1006 may access member data 132 associated with the client. A predicted obesity-related health care spend by the client may be forecast based on the population data. A predicted obesity-related health care spend by the client may be forecast based on the population data 136 and a predicted impact of the implementation of a wellness therapy program by a client, such as a behavioral consultant program.

In some embodiments, the forecasting module 1006 may be used to predict a percentage of a member population that will achieve successful weight loss after a first step weight loss program and another percentage that will achieve successful weight loss after a second step weight loss program.

In some embodiments, the forecasting module may access member data 132. The member data 132 may be received from the client device 120, the benefit manager device 106, or otherwise. The member data may be transmitted in a member feed, or may otherwise be provided. The member data may include age, sex, race, body mass index (BMI), medication usage, or the like. The member data may then be used by the forecasting module to predict a spend associated with a disease state or a specific member condition (e.g., obesity). In some embodiments, the member data 132 may include information received from a health risk assessment (HRA).

The results module 1008 determines results associated with member involvement with a wellness therapy program. The results may reflect a number of members that were involved in the wellness therapy program, the completion rate of members in the wellness therapy program, an amount of weight lost by members in the wellness therapy program, or the like. In some embodiments, the results determined by the results module 1008 may reflect an amount of money saved on other members by implementation of the wellness therapy program.

The targeting module 1010 determines members associated with the wellness therapy program to target. In an example embodiment, the targeting module 1010 may determine a subset of members to target for the wellness therapy program. The targeting may be performed based on a cost basis, a time basis, a program participation availability basis, or otherwise.

In some embodiments, the targeting module 1010 may identify members based on a likelihood of success as determined by the forecasting module. The identification of the members may be performed on the basis of prescription drug claims, medical claims, or the like. In an example embodiment, members may be identified and/or targeted based on a health condition. Such health condition may be known (e.g., affirmatively included in member data 132) or predicted (e.g., based on available data regarding prior prescriptions, treatments, and the like). In an example embodiment, members requiring therapy for type 2 diabetes, hypertension, and/or lipids may be determined to be particularly likely to benefit from participation in a weight loss program.

The targeting module 1010 may also be used to identify a wellness therapy program most likely to be effective for a specific member. For example, a member who is especially overweight and/or who has particularly significant obesity-related conditions may be targeted for participation in weight loss drug therapy programs or weight loss surgical programs. In some embodiments, such members may be targeted for concurrent participation in programs—such as a behavior modification program and a drug-therapy program.

In some embodiments, the targeting performed by the targeting module 1010 may include generating a member wellness therapy program participation inquiry. The member wellness therapy program participation inquiry may be transmitted to the member. A member wellness therapy program participation response may be received, e.g., from the member. In some embodiments, approval participation by a member in a wellness therapy program may be based on the receipt of the member wellness therapy program participation inquiry.

Figure 11:
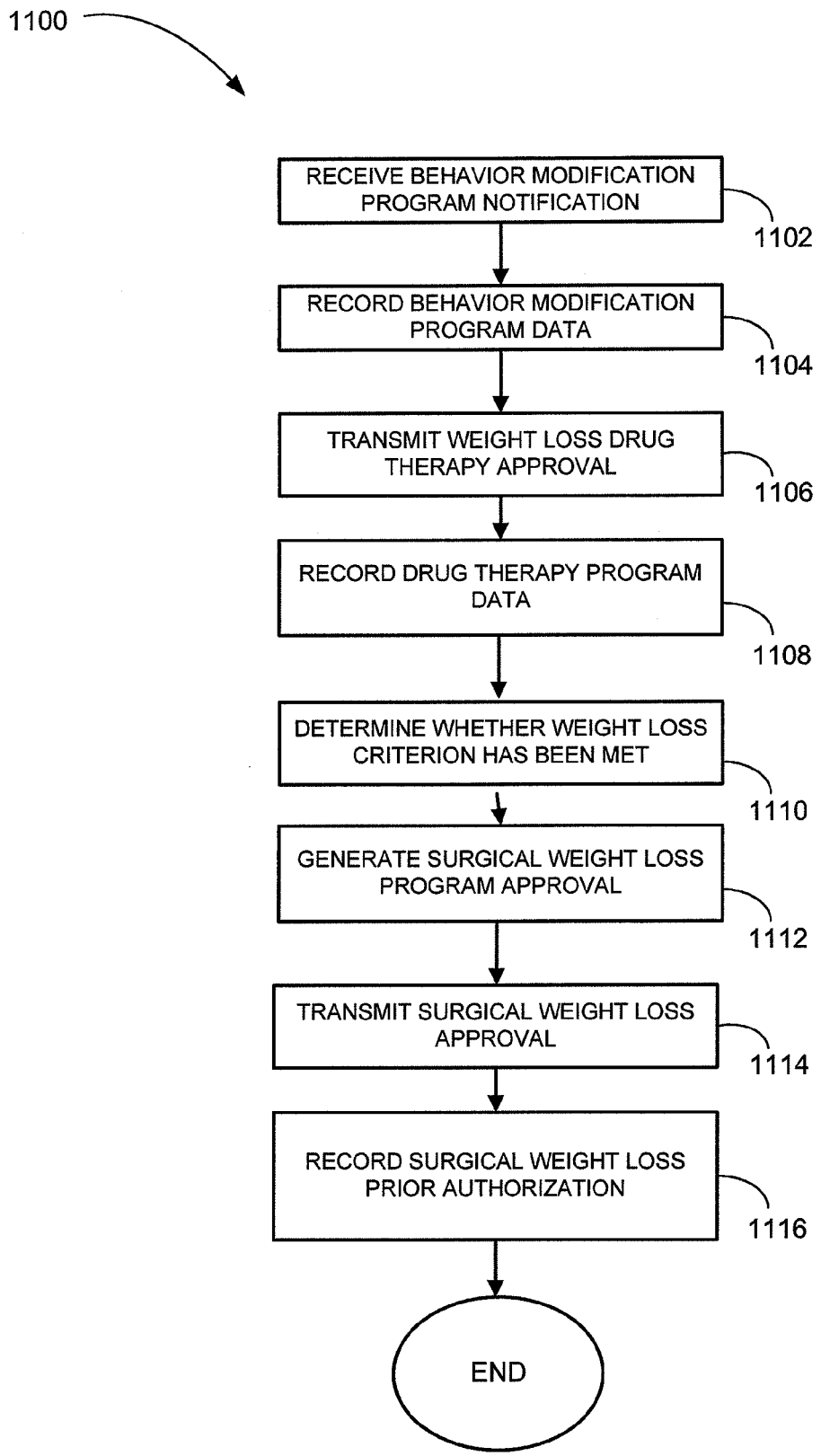
FIG. 11 is a block diagram of a flowchart illustrating a method of administering a weight loss step therapy program, according to an example embodiment.

FIG. 11 illustrates a method 1100 of administering a weight loss step therapy program, according to an example embodiment. The method 1100 may be performed by the therapy manager therapy device 102, partially by the therapy manager device 102 and partially by the benefit manager device 106 and/or vendor devices 108-116, or may be otherwise performed.

At block 1102, a behavior modification program notification is received and behavior modification program data is recorded at block 1104. The behavior modification data may indicate participation in a weight loss behavior modification program.

A weight loss drug therapy program approval is transmitted at block 1106. The approval may authorize a benefit manager to adjudicate a claim associated with a weight loss therapy drug.

At block 1108, drug therapy program data is recorded. The drug therapy program data may reflect fulfillment of a drug associated with a weight loss drug program after the member participated in the weight loss behavior modification program.

At block 1110, a determination of whether a weight loss surgical program criterion has been met is performed based on analysis of the behavior modification program data and the drug therapy program data recorded in blocks 1104 and 1108. By way of example, the weight loss surgical program criteria may be based on participation by the member in the weight loss behavior modification program and the fulfillment of the drug associated with the weight loss drug therapy program for the member.

When a determination that the surgical weight loss program criterion has been met, then at block 1112, a surgical weight loss program approval is generated.

The surgical weight loss program approval is transmitted at block 1114 and, at block 1116, a surgical weight loss program prior authorization is recorded.

Figure 12:
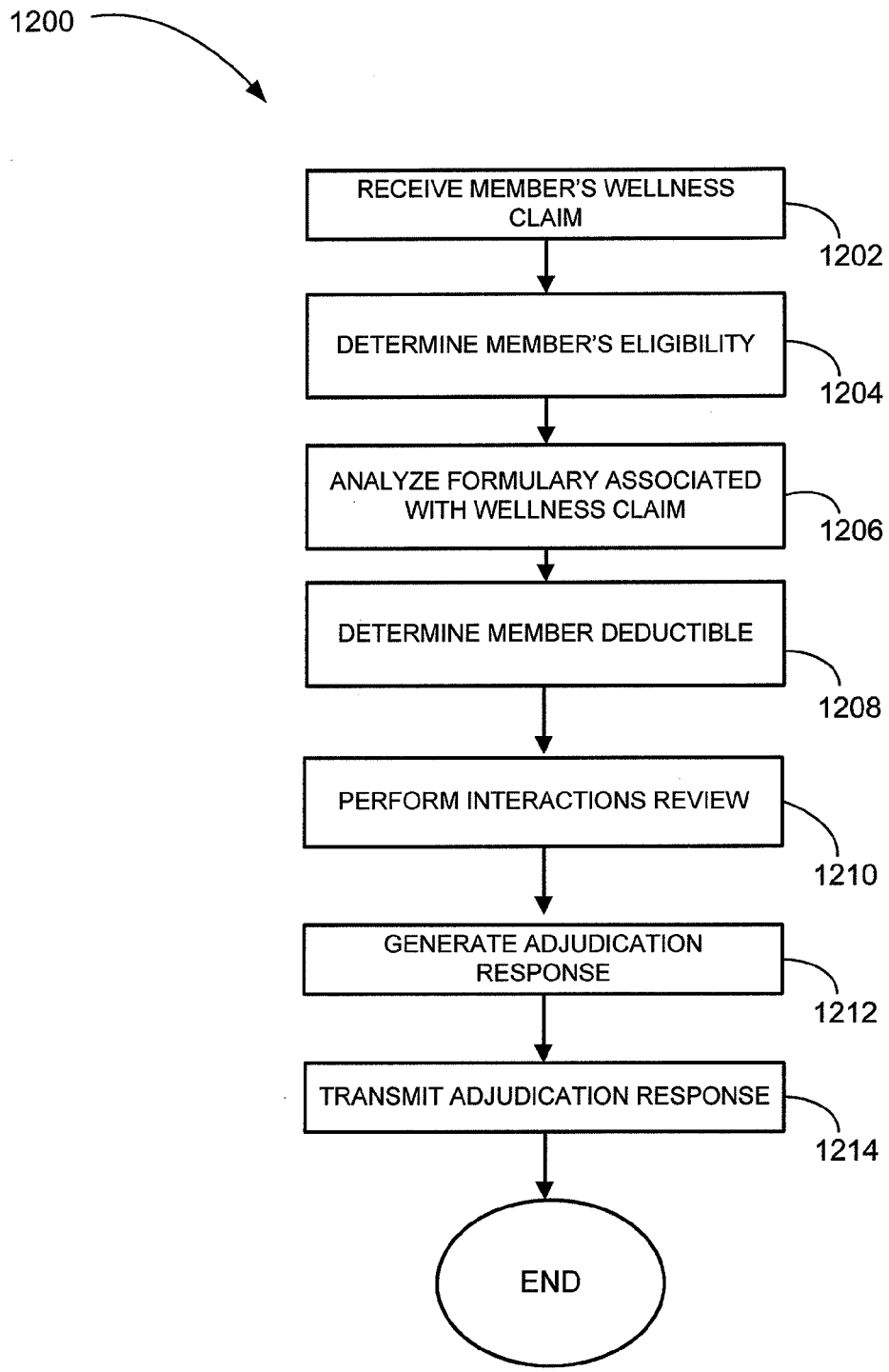
FIG. 12 is a block diagram of a flowchart illustrating a method of processing a wellness claim, according to an example embodiment.

FIG. 12 illustrates a method 1200 of processing a wellness claim, according to an example embodiment. The method 1200 may be performed by the benefit manager device 106, partially by the benefit manager device 106 and partially by the therapy manager device 102, or may be otherwise performed.

A member's wellness claim is received at block 1202.

At block 1204, the member's eligibility is determined.

A wellness formulary associated with the wellness claim is analyzed at block 1206 to determine an amount of a member co-pay for the wellness claim.

A member deductible associated with the wellness claim is determined at block 1208 and, at block 1210, an interactions review is performed.

At block 1212, an adjudication response is generated, based on adjudicating the wellness claim.

The adjudication response is transmitted at block 1214.

Figure 13:
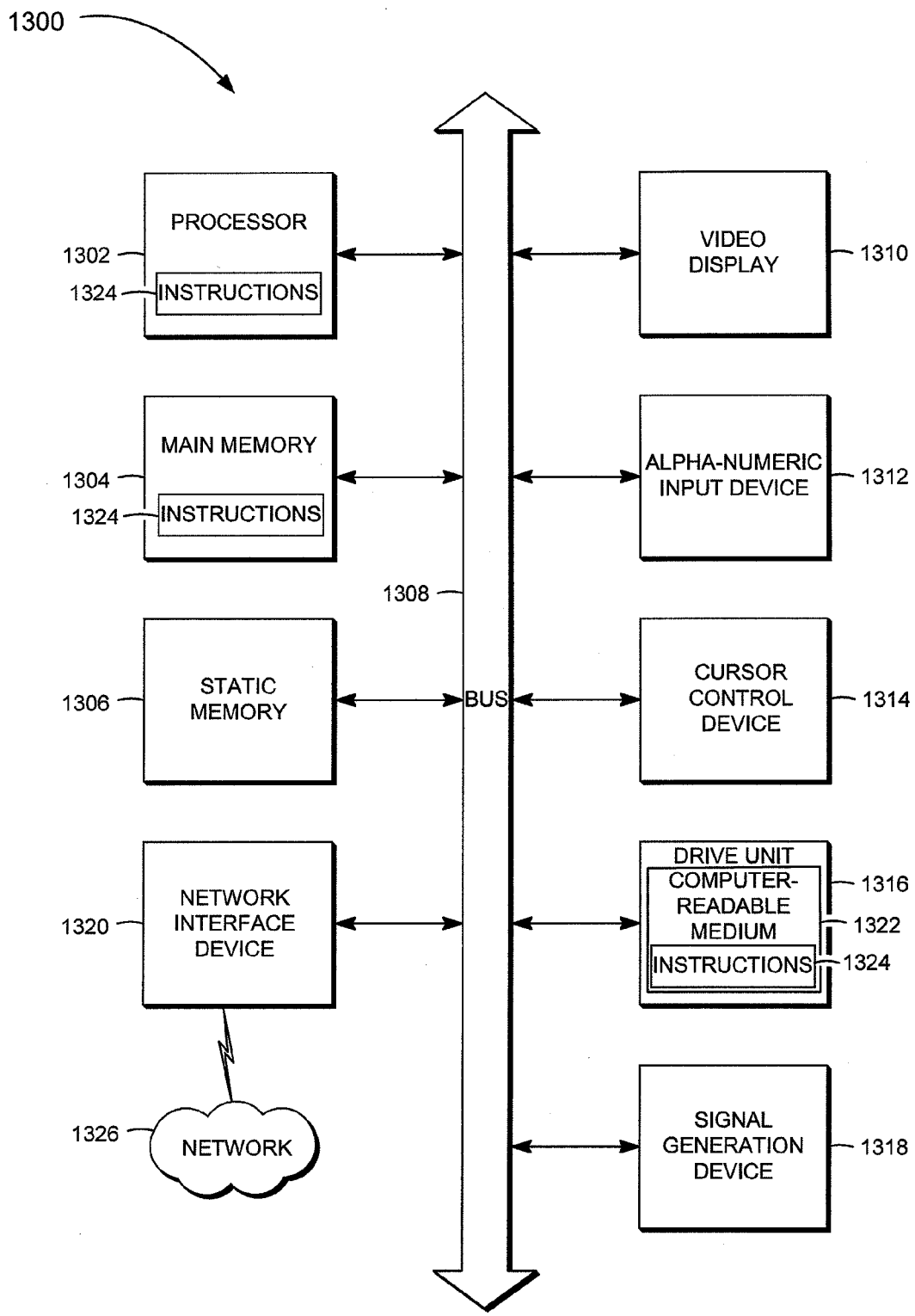
FIG. 13 is a block diagram of a machine in the example form of a computer system within which a set of instructions for causing the machine to perform any one or more of the methodologies discussed herein may be executed.

FIG. 13 shows a block diagram of a machine in the example form of a computer system 1300 within which a set of instructions may be executed causing the machine to perform any one or more of the methods, processes, operations, or methodologies discussed herein. The weight loss step therapy device 102, the weight loss benefit management device 106, the targeted member weight loss device 108, and the consultant communication device 110 may include the functionality of the one or more computer systems 1300.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU) a graphics processing unit (GPU) or both), a main memory 1304 and a static memory 1306, which communicate with each other via a bus 1308. The computer system 1300 further includes a video display unit 1310 (e.g., a liquid crystal display (LCD) or a cathode ray tube (CRT)). The computer system 1300 also includes an alphanumeric input device 1312 (e.g., a keyboard), a cursor control device 1314 (e.g., a mouse), a drive unit 1316, a signal generation device 1318 (e.g., a speaker) and a network interface device 1320.

The drive unit 1316 includes a computer-readable medium 1322 on which is stored one or more sets of instructions (e.g., software 1324) embodying any one or more of the methodologies or functions described herein. The software 1324 may also reside, completely or at least partially, within the main memory 1304 and/or within the processor 1302 during execution thereof by the computer system 1300, the main memory 1304 and the processor 1302 also constituting computer-readable media.

The software 1324 may further be transmitted or received over a network 1326 via the network interface device 1320.

While the computer-readable medium 1322 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

In an example embodiment, a weight loss system and method includes recording behavior modification program data. The behavior modification program data indicates at least participation by a member in a weight loss behavior modification program. Drug therapy program data is recorded. The drug therapy program data indicates at least drug fulfillment on behalf of the member of a drug associated with a weight loss drug therapy program. The at least drug fulfillment on behalf of the member of the drug associated with the weight loss drug therapy program occurs after the at least participation by the member in the weight loss behavior modification program. It is determined whether a weight loss surgical program criteria has been met based on analysis of the behavior modification program data and the drug therapy program data. The weight loss surgical program criteria is based on at least the participation by the member in the weight loss behavior modification program and at least the fulfillment of the drug associated with the weight loss drug therapy program for the member. A surgical weight loss program approval is generated based on a determination that the surgical weight loss program criteria has been met.

In an example embodiment, a wellness claim of a member is received. The wellness claim is associated with a wellness therapy program. The wellness claim is adjudicated. An adjudication response is generated based on adjudicating the wellness claim.

Thus, methods of administering weight loss programs and methods of processing wellness claims have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A method comprising:
recording, using a processor, behavior modification program data, the behavior modification program data indicating at least participation by a member in a weight loss behavior modification program that includes a diet program, an exercise program, or a diet and exercise program established for the member;
recording, using the processor, drug therapy program data, the drug therapy program data indicating at least drug fulfillment reflecting filing of a prescription for a drug at a pharmacy on behalf of the member, the drug associated with a weight loss drug therapy program, the at least drug fulfillment on behalf of the member of the drug associated with the weight loss drug therapy program occurring after the at least participation by the member in the weight loss behavior modification program;
determining, using the processor, whether a weight loss surgical program criteria has been met based on analysis of the behavior modification program data and the drug therapy program data, the weight loss surgical program criteria being based on at least the participation by the member in the weight loss behavior modification program and at least the fulfillment of the drug associated with the weight loss drug therapy program for the member; and
in response to the determination that the surgical weight loss program criteria has been met, generating, using the processor, a surgical weight loss program approval.

2. The method of claim 1, further comprising:
transmitting a weight loss drug therapy program approval to a benefit manager device, the weight loss drug therapy program approval authorizing a benefit manager associated with the benefit manager device to adjudicate a claim associated with a weight loss therapy drug.

3. The method of claim 1, further comprising:
receiving a behavior modification program notification,
wherein recordation of the behavior modification program data is based on receipt of the behavior modification program notification.

4. The method of claim 3, wherein the behavior modification program notification includes a weight loss behavior modification program participation notification.

5. The method of claim 1, wherein the behavior modification program data includes a weight loss behavior modification prior authorization, the weight loss behavior modification prior authorization being a prior authorization reflecting satisfactory engagement by the member in the weight loss behavior modification program.

6. The method of claim 1, further comprising:
transmitting a weight loss behavior modification program approval to a behavior modification manager device, the weight loss behavior modification program approval authorizing member benefits to be provided to the member by a behavior modification manager associated with the behavior modification manager device.

7. The method of claim 1, further comprising:
recording behavioral consultant data, the behavioral consultant data indicating at least a behavioral analysis performed by a behavioral consultant on a work location associated with the member,
wherein the surgical weight loss program criteria is further based on performance of at least the behavioral analysis by the behavioral consultant on the work location associated with the member, and
wherein a determination of whether the weight loss surgical criteria has been met is based on analysis of the behavior modification program data, the drug therapy program data, and the behavioral consultant data.

8. The method of claim 7, further comprising:
receiving a behavioral consultant notification,
wherein recordation of the behavioral consultant data is based on receipt of the behavioral consultant notification.

9. The method of claim 8, wherein the behavioral consultant notification includes a behavioral consultant program completion reflecting implementation of at least some of the suggestions provided by the behavioral consultant.

10. The method of claim 7, wherein the behavioral consultant data includes a behavioral consultant prior authorization, the behavioral consultant prior authorization being a prior authorization reflecting at least satisfactory participation by a company associated with the member in implementation some of the suggestions provided by the behavioral consultant during the behavioral analysis.

11. The method of claim 7, wherein recordation of the behavioral consultant data is performed prior to recordation of the behavior modification program data.

12. The method of claim 7, wherein recordation of the behavior modification program data is performed prior to recordation of the behavioral consultant data.

13. The method of claim 1, further comprising:
recording nutritional assistance data, the nutritional assistance data indicating at least participation by the member in a nutritional assistance program,
wherein the surgical weight loss program criteria is further based on performance of at least participation by the member in the nutritional assistance program, and
wherein a determination of whether the weight loss surgical criteria has been met is based on analysis of the behavior modification program data, the drug therapy program data, and the nutritional assistance data.

14. The method of claim 13, further comprising:
receiving a nutritional assistance notification,
wherein recordation of the nutritional assistance data is based on receipt of the nutritional assistance notification.

15. The method of claim 14, wherein the nutritional assistance notification includes a nutritional assistance program completion notification reflecting delivery of at least some of the meals associated with the nutritional assistance program.

16. The method of claim 14, wherein the nutritional assistance data includes a nutritional assistance prior authorization, the nutritional assistance prior authorization being a prior authorization reflecting at least satisfactory engagement by the member in the nutritional assistance program.

17. The method of claim 13, wherein recordation of the nutritional assistance data is performed prior to recordation of the behavior modification program data.

18. The method of claim 13, wherein recordation of the behavior modification program data is performed prior to recordation of the nutritional assistance data.

19. The method of claim 1, further comprising:
recording a surgical weight loss program prior authorization based on generation of the surgical weight loss program approval.

20. The method of claim 1, further comprising:
receiving a weight loss related health claim of the member;
adjudicating the weight loss related health claim based on receipt of the weight loss related health claim and generation of the surgical weight loss program approval; and
generating an adjudication response based on adjudication of the weight loss related health claim.

21. The method of claim 1, wherein the behavior modification program data includes a plurality of weight loss behavior modification program records from an administrator of the weight loss behavior modification program reflecting participation by the member in the weight loss behavior modification program, the method further comprising:
analyzing the plurality of weight loss behavior modification program records to determine whether the member has satisfactorily participated in the weight loss behavior modification program,
wherein determining whether the weight loss surgical program criteria has been met is based on a determination that the member has satisfactorily participated in the weight loss behavior modification program and on analysis of the drug therapy program data.

22. The method of claim 1, further comprising:
determining that a sufficient level of prescription drug adherence has been met based on the drug therapy program data,
wherein determining whether the weight loss surgical program criteria has been met is based on a determination that a sufficient level of prescription drug adherence has been met and on analysis of the behavior modification program data.

23. A method comprising:
recording behavior modification program data, the behavior modification program data reflecting participation by a member in a weight loss behavior modification program that includes a diet program, an exercise program, or a diet and exercise program established for the member;
recording drug therapy program data, the drug therapy program data indicating at least drug fulfillment reflecting filing of a prescription for a drug at a pharmacy on behalf of the member, the drug associated with a weight loss drug therapy program, the at least drug fulfillment on behalf of the member of the drug associated with the weight loss drug therapy program occurring after the at least participation by the member in the weight loss behavior modification program;
verifying completion of a plurality of ordered weight loss step therapy program steps in accordance with a formulary, the plurality of ordered weight loss step therapy program steps having a sequence including initiating participation by the member in the weight loss behavior modification program prior to initiating participation by the member in the weight loss drug therapy program;
determining whether a weight loss surgical program criteria has been met based on verification of the completion of the plurality of ordered weight loss step therapy program steps, the weight loss surgical program criteria being based on at least the participation by the member in the weight loss behavior modification program and at least the fulfillment of the drug associated with the weight loss drug therapy program for the member;
determining a level of healthcare plan coverage based on analysis of the behavior modification program data and the drug therapy program data; and
in response to the determination that the surgical weight loss program criteria has been met, transmitting a surgical weight loss program approval and recording a surgical weight loss program prior authorization, the surgical weight loss program approval including the level of health coverage that applies to a surgical weight loss program.

* * * * *